(12) United States Patent
Ravula

(10) Patent No.: US 8,214,856 B2
(45) Date of Patent: Jul. 3, 2012

(54) EMERGENCY ALERT SYSTEM FOR VIDEO ON DEMAND VIEWERS

(75) Inventor: Dheeraj Ravula, Roswell, GA (US)

(73) Assignee: Ericsson Television, Inc, Duluth, GA (US)

( * ) Notice: Subject to any disclaimer, the term of this patent is extended or adjusted under 35 U.S.C. 154(b) by 382 days.

(21) Appl. No.: 12/704,199

(22) Filed: Feb. 11, 2010

(65) Prior Publication Data

US 2011/0197223 A1    Aug. 11, 2011

(51) Int. Cl.
*H04N 7/10* (2006.01)
*H04N 7/173* (2011.01)
*H04N 7/16* (2011.01)

(52) U.S. Cl. ............... 725/33; 725/91; 725/92; 725/93; 725/114; 725/115; 725/116; 725/145; 725/146

(58) Field of Classification Search ............. 725/33, 725/86–104, 114–116, 145–146
See application file for complete search history.

(56) References Cited

U.S. PATENT DOCUMENTS

| | | | |
|---|---|---|---|
| 2007/0209054 A1* | 9/2007 | Cassanova | 725/100 |
| 2009/0138604 A1* | 5/2009 | Collet et al. | 709/227 |
| 2010/0075591 A1* | 3/2010 | Eyer et al. | 455/3.01 |
| 2011/0010736 A1* | 1/2011 | Kim et al. | 725/33 |
| 2011/0099575 A1* | 4/2011 | Woo et al. | 725/33 |

OTHER PUBLICATIONS

Tsunami Warning System. NOAA http:/www.tsunami.noaa.gov/images/warning-system-smaller.jpg, Nov. 2009.
EAS Emergency Alert System. 2007 Cable Systems (including Digital Cable) Handbook. Federal Communications Commission. 2007.
Xport Recorder/Slicer Producer. Tandberg television. Jul. 2009.
ADI 2.0 Specification Asset Structure MD-SP-ADI2.0-AS-I03-070105. Metadata 2.0 Specifications, Jan. 2007.

* cited by examiner

*Primary Examiner* — Hoang-Vu A Nguyen-Ba

(57) ABSTRACT

Viewers of video on demand ("VOD") programs are automatically presented with Emergency Alert System ("EAS") information during an invocation of the EAS system. A VOD Support System receives notification of an EAS event and directs EAS information to be stored in a VOD Server. The VOD Support System then invokes a function in the VOD Server, causing the VOD server to suspend all active VOD streams and, instead, stream out the EAS information comprising a preamble and emergency information identified by the VOD Support System. Upon completion of streaming this information, the VOD Server will automatically resume each of the VOD programs previously suspended. VOD viewers watching a VOD session that is interrupted by an EAS test are thus automatically returned to their VOD programming at the point where their program was interrupted.

20 Claims, 5 Drawing Sheets

EMERGENCY ALERT SYSTEM FOR VIDEO ON DEMAND VIEWERS

FIELD OF THE INVENTION

The present invention is generally directed to systems and methods for providing emergency alerts to viewers while viewing a video on demand program from their video service provider.

BACKGROUND OF THE INVENTION

The Emergency Alert System ("EAS" or "EAS system") is a national public warning system that requires communication service providers, such as TV and radio broadcasters, cable television systems, wireless cable systems, satellite digital audio radio service (SDARS) providers, direct broadcast satellite (DBS) service providers, and wireline video service providers, to offer to the President the communications capability to address the American public during a national emergency. The system also may be used by state and local authorities to deliver important emergency information such as AMBER (missing children) alerts and emergency weather information targeted to a specific area.

The EAS allows communication providers to send and receive emergency information quickly and automatically, even if their facilities are unattended. If one link in the system for spreading emergency alert information is broken, members of the public have multiple alternate sources of warning. EAS equipment also provides a method for automatic interruption of regular programming, and in certain instances, is able to relay emergency messages in languages other than English.

Along with its capability of providing an emergency message to the entire nation simultaneously, the EAS allows authorized state and local authorities to quickly distribute important local emergency information. A state emergency manager can use the EAS to broadcast a warning from communication service providers in a particular state. EAS equipment in that state, including radio, television stations, as well as in cable television systems, can automatically monitor and rebroadcast the emergency information. Additionally, EAS equipment can directly monitor the National Weather Service ("NWS") for local weather and other emergency alerts, which local broadcast stations, cable systems, and other EAS participants can then rebroadcast, providing an almost immediate relay of local emergency messages to the public.

The most common form of public interaction is likely through the broadcasting of weather warnings, which may be issued by the National Weather Service (NWS), which is provided by the National Oceanic and Atmospheric Administration ("NOAA"). Television program viewers have likely experienced the audible warning tones interrupting a program, followed by an indication that a warning is to be issued, followed by the warning. The warning may pertain to tornadoes, high winds, flooding, etc.

The EAS system is also periodically tested, and this ensures equipment performs as desired. Such testing also can interrupt video programs, but is usually preceded by an announcement that the EAS event is a test, and not an actual emergency. For purposes of this document, reference to an "EAS event" can be either an actually notification of an emergency, or a test of the system, whereas reference to an "EAS Test" refers only to a test of the system. The initiation of an EAS event is associated with an EAS Alert or Notification.

In cable television systems, an EAS Alert typically interrupts any live broadcast program viewed by the viewers. Reference to a "broadcast program" means any network based regularly scheduled program. On a cable system, channels carrying live broadcasts are also interrupted, and the emergency information is then played in place of the broadcasting programming. When an EAS event occurs during a broadcasting program, for either an over-the-air or cable transmission system, the portions of the broadcast program that have been interrupted are not viewable by the viewer. When the EAS Alert is completed, the broadcast programming resumes in real time. In other words, because resumption occurs at the current point in the broadcast of the program, the information interrupted by the EAS is "lost."

For cable subscribers that view a broadcast program with a set top box, the occurrence of the EAS information is transparent to the set top box. In other words, the contents of the channel conveying the broadcast channel have been substituted by the emergency information in the cable headend. Thus, the set top box remains tuned to the same channel while the content is replaced with the emergency information in the cable headend. Once completed, the programming resumes.

For cable subscribers viewing a video-on demand program, the operation is slightly different. VOD programs are typically streamed to a viewer using a channel selected by the headend. The cable headend informs the set top box ("STB") which channel to tune to. The coordination between the headend and the set top box for viewing a VOD program result in creating a "VOD Session." Typically, when a viewer selects a VOD movie to watch, they are not aware of the procedures required to establish a VOD Session, and typically are not aware that the set top box has tuned to another channel to receive the program.

If an EAS event occurs during a VOD Session, an EAS Alert will result in the cable headend instructing the set top box to suspend the VOD Session. This will result in the set top box reverting back to original channel (which may have been a VOD Menu Selection channel). The cable headend will substitute the EAS information for the VOD Menu Selection information, and this information will then be presented to the viewer.

The above procedure works properly to present EAS information to a viewer of a VOD program. In case of an actual test, the viewer would likely stay tuned to receive additional information, or perhaps change channels to a news oriented program to receive additional information. During an actual emergency, the user typically could not establish a VOD session (nor would most users attempt to do so).

However, as noted previously, the system is periodically tested. Thus, many VOD viewers will have a VOD Session interrupted due to an EAS Test, and will then return to viewing the VOD program. This is done by re-initiating the request for the VOD program, which results in resuming the suspended VOD session. As can be expected, many VOD viewers will want to resume viewing their respective VOD programs after an EAS Test, and this can cause a large number of simultaneous requests to the VOD servers in the cable service provider. The large number of requests can create difficulties in the VOD servers, and potentially even cause the VOD servers to crash, or delay responding in resuming the VOD Sessions.

Thus, systems and methods are required video service providers to effectively and efficiently resume VOD programming after an EAS Test.

BRIEF SUMMARY OF THE INVENTION

In one embodiment of the invention, a system for providing emergency information to a VOD viewer comprises a real-time video asset generator configured to receive emergency information from a video broadcast transmission and generate an emergency information digital video asset, a VOD server configured to store a plurality of video assets including an emergency alert information asset, and a VOD support system comprising a processor configured to: receive an emergency alert notification, request an address location from said VOD server where an video asset comprising said emergency alert information asset can be stored, receive a response from said VOD server indicating said address location, provide said address location to said real-time video asset generator, and invoke an EAS EVENT function in said VOD server, wherein said VOD server causes an emergency alert preamble and an emergency message to be provided to said VOD viewer.

In another embodiment of the invention, a method for providing emergency information to a VOD viewer comprises the steps of receiving an EAS notification in a processor of a VOD Support System from a real-time video asset generator, wherein said real-time video asset generator is configured to generate a emergency information asset comprising said emergency information, requesting an address location by said processor from a VOD server, providing said address location to said real-time video asset generator, transmitting said emergency information asset to said VOD server, and invoking by said processor at said VOD server, an EAS EVENT function wherein said VOD server causes an emergency alert preamble and said emergency information to be provided to said VOD viewer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
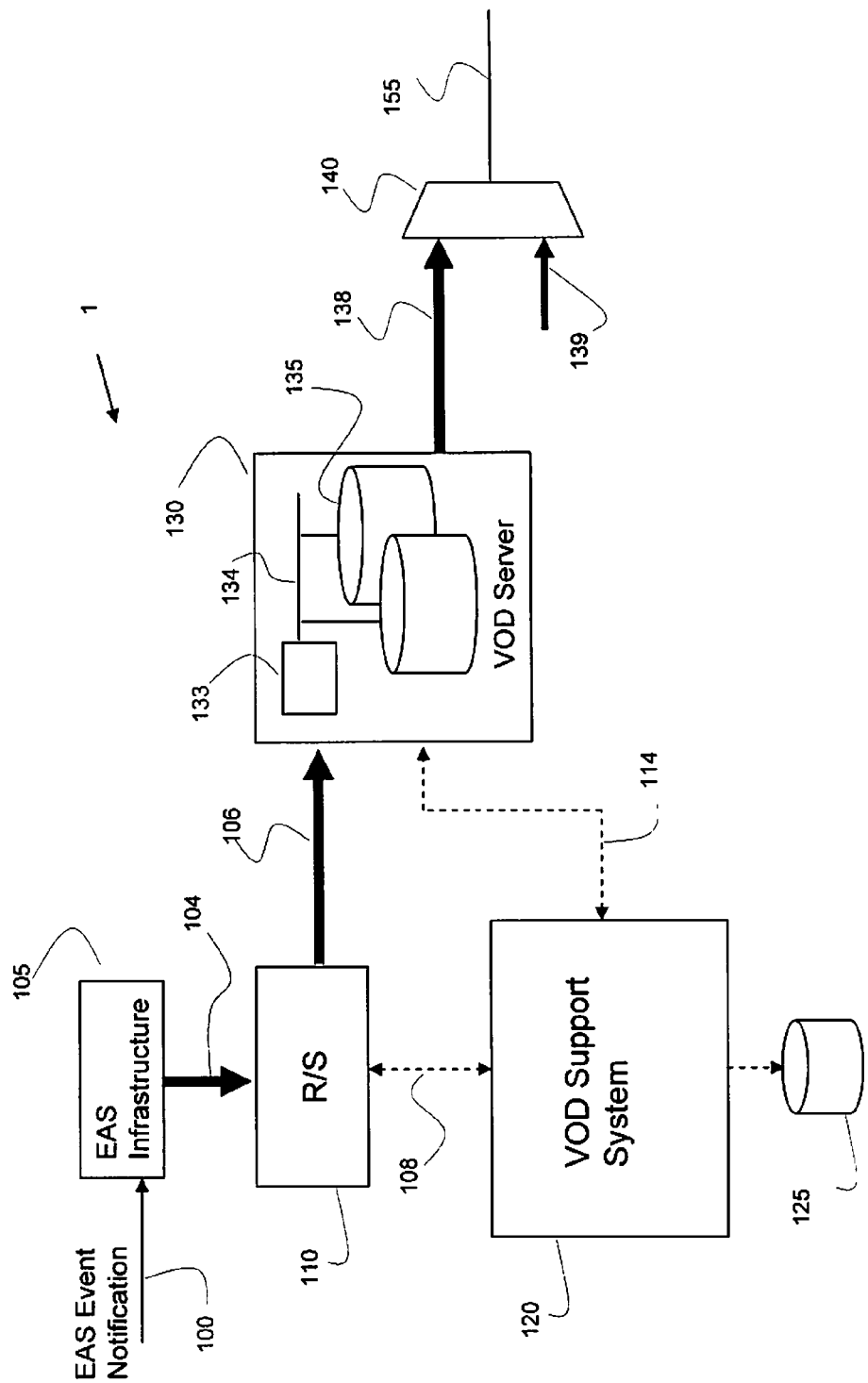
FIG. 1 illustrates one embodiment of a EAS system providing for emergency information to VOD viewers.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

As should be appreciated, the embodiments may be implemented in various ways, including as methods, apparatus, systems, or computer program products. Accordingly, the embodiments may take the form of an entirely hardware embodiment or an embodiment in which computing hardware, such as a processor or other special purpose devices, is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

The embodiments are described below with reference to block diagrams and flowchart illustrations of methods performed using computer hardware, apparatus, systems, and computer-readable program products. It should be understood that each block of the block diagrams and flowchart illustrations, respectively, may be implemented in part by computer-readable program instructions, e.g., as logical steps or operations executing on a processor in a computing system or other computing hardware components. These computer-readable program instructions are loaded onto a computer, such as a special purpose computer or other programmable data processing apparatus, to produce a specifically-configured machine, such that the instructions which execute on the computer or other programmable data processing apparatus implement the functions specified in the flowchart block or blocks.

The Emergency Alert System ("EAS" or "EAS system") is a system developed and presently in use by the government to provide real-time notification of emergencies and associated emergency information to the general population. The EAS system allows access by various regulatory agencies to provide different types of warning information to defined geographical locations of the public. Infrastructure is presently in place to provide emergency information over communication networks, such as the airwaves and wire-based networks. Common examples of airwave networks include radio and television broadcasting, and a common example of wire-based networks includes cable distribution networks.

The infrastructure includes the ability to test the system on a periodic basis. The EAS test results in interrupting programming on communication networks. During an EAS Event, whether it be a test or actual emergency, the communication provider first plays a test preamble comprising three short sounds ("alert tones"), followed by the emergency message or EAS information. In a test, the emergency message is actually a test message, but in an actual emergency, the message would comprise emergency information. The emergency information could be audio in the case of radio, or a video (with audio) information in the case of television.

In the case of broadcast television programs, whether received over the air or as a channel using a cable system, the television programming is interrupted. No special capabilities are required in the television set, or a set top box if used, in a cable system. However, in the case of VOD, the user typically is receiving a program (such as a movie) that is being streamed based on data stored in a VOD server. In such cases, the cable system instructs the set top box to suspend the VOD session, and revert to tuning to a predetermined channel. That predetermined channel would receive the emergency information, which would be automatically presented to the viewer. If the event were a test, the viewer would likely resume the VOD session, and typically, all the VOD users would typically request to resume their VOD session. The users have to perform the resumption manually (e.g., by selecting the program via the VOD menu) and this causes a potential overload of the VOD servers, and can create delays, as well as potentially cause service interruptions.

In the embodiments of the invention presented herein, a cable system is used for illustration, but the invention can apply to various distribution technologies that involve video on demand sessions. Thus, application of the invention can be used with wireless or other wireline technologies distributing VOD programs to viewers, including satellite distribution technologies, cellular technologies, etc. Further, the invention applies to various communication protocols used to transport the video information, including MPEG, IP, or other forms.

In describing the operation of the system, the system of the present invention can be called an EAS System for VOD viewers, or "EAS-VOD System." The phrase "EAS system" is used herein to refer to the prior art EAS system that interfaces with existing cable network. The phrase "EAS-VOD system" refers to a system embodying the invention for VOD viewers. The occurrence of an EAS test, or an actual emergency, is generally referred to hereafter as an "EAS Event." The initiation of an EAS Event to a cable system operator is initiated by an EAS notification. From a viewer's perspective, an EAS Event begins with the viewer hearing an "EAS Preamble," which are the three warning tones typically preceding presentation of the emergency information. However, application of the invention can readily use other types of tones or information in the EAS Preamble if that is desired. After the viewer hears the EAS Preamble, the viewer will be presented with the EAS message or information. This can be also referred to as an "emergency message" or "emergency information." In an EAS Event, the information can be information identifying the event as a test or the actual emergency message. In an actual emergency, the contents of the emergency information may vary based on the type of emergency (e.g., flood warning, tornado warning, etc.).

The EAS Event notification can occur in various ways, and in one embodiment relies on existing methods of communication with the cable service provider via the EAS system infrastructure. The present invention encompasses using existing notification methods.

FIG. 1 illustrates one embodiment of the EAS-VOD system 1 for practicing one embodiment of the present invention. In FIG. 1, an EAS Event Notification 100 is received by the cable system operator, including use of existing broadcast or other means. The Notification 100 is received by EAS infrastructure 105, which captures the EAS Event information, including the emergency information. In one embodiment, the EAS Infrastructure includes equipment that can receive broadcast EAS information and provide the information using a wireline transmission standard. Thus, the EAS Event Notification and related information may be received wirelessly by the EAS infrastructure 105, and provided over a co-axial cable 104 to other equipment.

The EAS Event Notification and related data are provided to a recorder/slicer ("R/S") which is a device capable of receiving broadcast content in real time, and providing an "asset package" or "package." It can also be referred to as a real-time asset package generator. A "package" is a video asset with associated meta-data that is structured to be compliant with an industry standard, such as those standards issued by CableLabs®. One such specification which the package and associated metadata may comply with is found in "Metadata 2.0 Specifications; ADI 2.0 Specification Asset Structure, MD-SP-ADI2.0-AS-I03-070105," the contents of which are incorporated by reference herein. Those skilled in the art will realize that other structures can be used. The Recorder/Slicer can be adapted from existing products, such as the Xport® Recorder/Slicer.

The R/S 110 receives the EAS Event information and can transcode the information into a digital form; specifically into a compliant digital video asset. In one embodiment, the R/S forms a CableLabs® compliant VOD package with associated meta-data. The R/S provides a digital file comprising the video along with meta-data. The meta-data includes various information about the digital file, such as its encoding format, identifier, length, type of information, etc. Further, the meta-data includes a digital video asset identifier, which is a numerical identifier that can be used to identify the video asset. In some embodiments, the asset itself is in one file or a portion of a file, and the meta-data is in another file. The combination is broadly referred to herein as an asset, and conformance with a defined format facilitates other equipment processing the package. As it will be seen, using the asset identifier created by the R/S 110 facilitates the other components being able to identify, store, retrieve and process the digital video asset generated by the R/S. The digital video asset generated based on the emergency information is called hereafter an EAS asset. The EAS asset combined with the meta-data is called an EAS package. Other defined formats for defining a package can be used, other than the CableLabs® based specifications.

The R/S 110 communicates with a VOD Support System ("VOD SS") 120. The communication 108 is bi-directional, and is shown as a dotted line 108 in FIG. 1, because the communication in this embodiment conveys signaling information. In other words, the EAS emergency information (e.g., digital video file produced by the R/S) is typically not provided to the VOD SS. In this embodiment, the R/S system informs the VOD SS that an EAS Event notification has occurred. The R/S may inform the VOD SS with further information, namely that the event is a test notification or an actual emergency notification. Further information may include the meta-data information, including the asset identifier, associated with the video asset being created by the R/S. In other embodiments, the VOD SS may not be informed with this level of detail. The VOD SS 120 may communicate with a VOD Server 130 over a communications link 114. The communication over link 114, as with link 108, may occur using a LAN, WAN, or other suitable data communications network. Typically, the VOD SS communicates with the VOD Server to either obtain an address for storing an EAS asset generated by the R/S, or to invoke an EAS related function in the VOD server 130. The communication link 114 typically supports bi-directional communication.

The R/S 110 also communicates with the VOD Server 130 over a communication facility 106 to provide the EAS emergency information. The information provided from the R/S to the VOD Server may comprise the digitally encoded video associated with the EAS Event, i.e., the EAS asset. Hence, the line 106 is shown as a solid line, indicating that digital video information may be sent. Hence, an appropriate communications facility must be used, namely one that has a larger bandwidth compared to link 114. The communication links 114 and 106 may be combined in some embodiments. In other embodiments, the EAS asset could be transmitted to the VOD Server 130 by way of the VOD SS 120, but this embodiment transmits the EAS asset from the R/S 110 to the VOD server 130.

The VOD Server 130 in this embodiment comprises a processor 133 connected to an internal bus or LAN 134, which communicates and controls various VOD database or data stores 135. The storage media can include various solid state or magnetic storage media. The VOD server can be based on known available VOD servers, but must be modified to provide additional functionality as described herein.

The VOD Server 130 is able to pump or stream video data over a communication facility 138 to a multiplexor 140 in a cable headend, which provides the EAS digitized video data over a cable distribution network 155. The multiplexor may receive other inputs 139, which may include broadcast data. Note that in an EAS Event, feed 139 may receive EAS related information that is broadcasted over the cable network 155 to non-VOD viewers.

Figure 2:
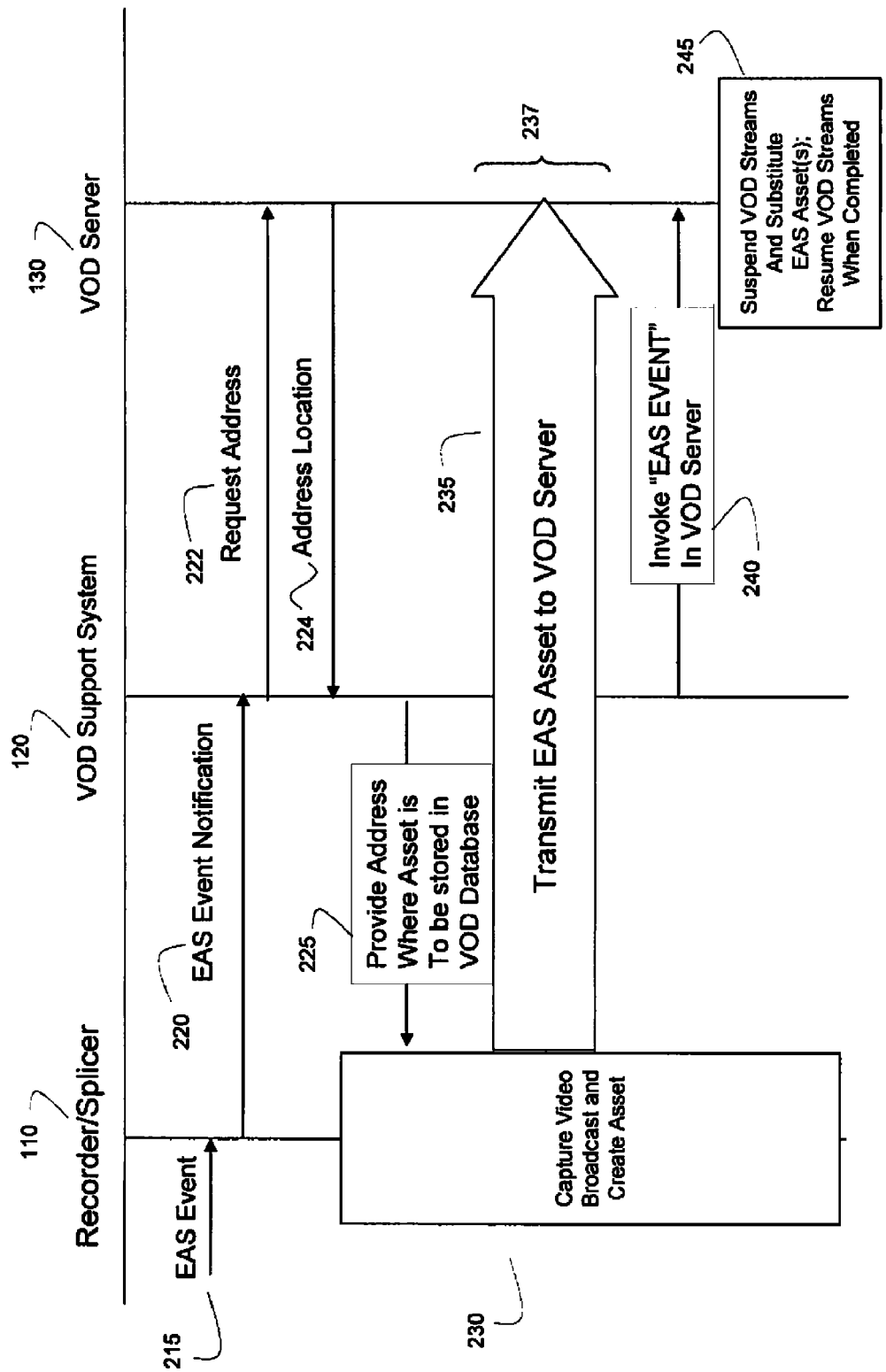
FIG. 2 illustrates a process flow associated with the VOD Server is providing emergency information to VOD viewers.

The operation of the EAS-VOD system 1 can be further illustrated in message flow diagram of FIG. 2. In FIG. 2, the components of the R/S 110, the VOD SS 120, and the VOD Server 130 are shown as entities in the message flow diagram. The process begins when the R/S 110 receives an EAS Event information 215, which comprises a notification and emergency information. In this embodiment, the EAS preamble is not provided, since that is usually a standard and fixed alerting tones. That information could already be stored in the VOD server. However, in other embodiments, both the preamble and the emergency information may be received at the R/S 110.

Upon receipt of the EAS Event information, the R/S initiates an EAS Event Notification message 220 to the VOD SS 120. This information informs the VOD SS that an EAS Event has occurred, and may further inform the VOD SS that the EAS Event is a test, or an actual emergency. In this embodiment, it is presumed that the EAS Event is an actual emergency. In other embodiments, there may not be an explicit notification as to whether this is a test or actual emergency. This results in the VOD SS 120 sending a Request Address 222 message to the VOD Server. This message requests an address for a storage location in the VOD Server to store incoming emergency information that has been formed into a digital video asset package. The VOD Server 130 responds with Address Location 224 data indicating where the emergency information (which in one embodiment comprises the asset and metadata) can be stored. Note that at this point in time, the VOD Server has not necessarily received the EAS emergency information package.

The R/S at the same time processes the emergency information to create in real-time an EAS package. This processing 230 occurs in real time and involves the R/S creating the associated asset information. In most embodiments, the R/S 110 performs this function as the emergency information comprising video information is being received and encoded into a digital video file, typically in MPEG format. The R/S is able to ingest broadcast information and create in real time a digital package for processing by the VOD SS. The R/S may also include in the EAS Event notification the asset identifier, or may provide the asset identifier information to the VOD SS in a separate message.

The VOD SS 120 informs the R/S 110 of the address information 225 in the VOD Server where the newly created asset is to be stored. This information is typically a URL address, which is one well known addressing scheme. Other addressing schemes could be used.

The R/S 110 now knows where the digital asset should be stored. As part of the asset creating process 230, the R/S transfers the EAS Asset 235 it is creating to the VOD Server. This can occur using well known file transfer protocols, such as FTP. Other protocols can be used. The digital video file, in this embodiment, does not pass through the VOD SS, but it could do so in other embodiments.

The R/S can begin to transmit the EAS asset before all of the EAS emergency information is received by the R/S. The vertical "height" 237 of arrow 235 is shown as less than the height of process 230 (thus implying the time duration of transferring the file is somehow less than of process 230 which is the time it takes for the R/S to receive the emergency information), but this is for convenience of illustration. Transmitting the EAS file from the R/S to the VOD Server takes at least as long as the time it takes for the R/S to receive the emergency information. That is, it is obvious that all of the emergency information cannot be transferred from the R/S to the VOD server before the R/S has received all of the emergency information.

Consequently, as the R/S is receiving the emergency information is real time and transcoding the information into digital video, the R/S is transferring a corresponding emergency information asset in real time (but typically, slightly delayed in time) and the VOD Server is receiving and storing the emergency information asset.

The VOD SS 120 then invokes an EAS EVENT function 240 in the VOD Server. The EAS Event function causes the VOD server to suspend the VOD streams, play the indicated video assets, and then resumes the VOD sessions. The VOD Server maintains a list of all active VOD sessions, and upon receiving this function, the VOD server suspends all the current VOD streams to VOD Viewers, and instead streams the EAS emergency asset to each VOD viewer. The EAS emergency asset can be identified to the VOD Server either by an asset identified indicated in the function, or by a memory location. The VOD Server is configured to stream the emergency asset information even though the VOD Server may not have completely received the asset. When streaming of the EAS emergency information asset is completed, the VOD Server then resumes the various VOD streams for the VOD viewers. Thus, the VOD viewers will receive the EAS video information in real time or near real time, whereby the VOD video is automatically replaced with the emergency information video information. Once the streaming of emergency information is completed, the VOD video is resumed without the VOD viewer requesting resumption of the VOD session.

During the EAS Event, the cable distribution network will also be transmitting emergency information over the broadcast channels. However, this action is part of the existing EAS system.

Figure 3A:
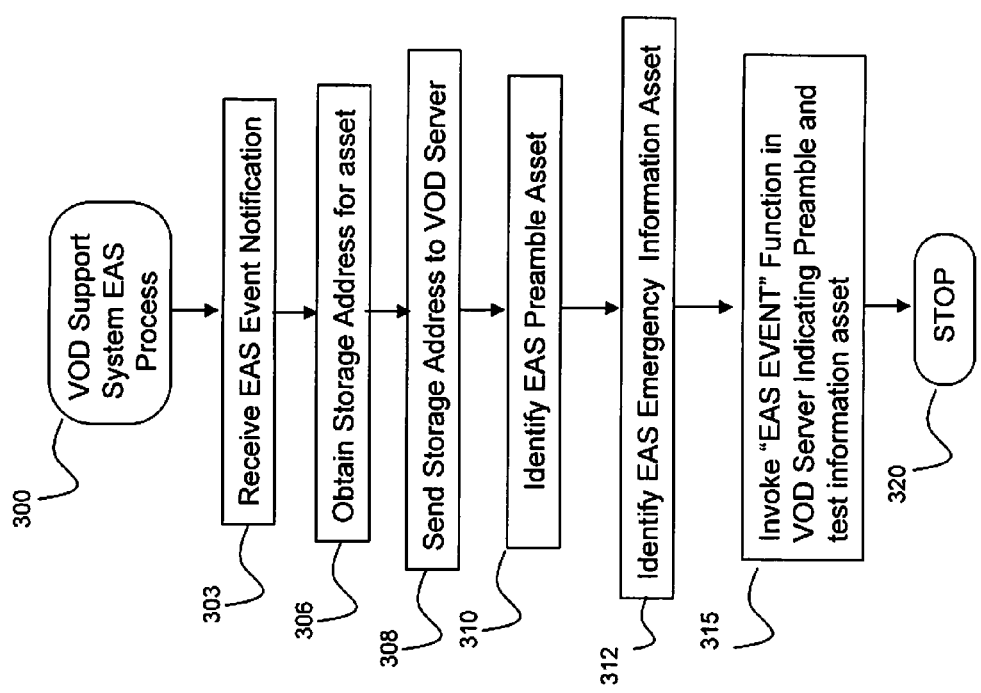
FIG. 3a illustrates a process flow associated with the EAS Testing process of the EAS system.

The government periodically tests the EAS system, so as to ensure that the communication service provider's equipment is properly functioning. The operation of a test is similar to an EAS actual emergency, and is illustrated in FIG. 3a. In FIG. 3a, one embodiment of the operation of the VOD Support System 300 is shown. The process begins with the EAS VOD Support System receiving a notification of an EAS Event in step 303. The VOD SS receives notification from the Recorder/Slicer which, in turn, receives notification from existing EAS infrastructure. The VOD SS in response initiates a query in step 306 to the VOD Server for an address location where the emergency asset generated by the Recorder/Slicer can be stored. Typically, the response from the VOD Server is an URL (Uniform Resource Locator), which is a well-known mechanism for identifying a location for reading/writing information. The VOD SS provides the address information to the Recorder/Slicer in step 308 so that the Recorder/Slicer can direct the asset to the VOD Server for storage using FTP or other means.

The VOD SS then identifies an EAS Preamble asset in step 310. Because each EAS message on a communication network is preceded by a preamble comprising a standard set of tones, the VOD SS may be programmed to use the same Preamble Asset each time. Next, the VOD SS determines the EAS Information Asset to use in step 312. In one embodiment, this is determined by a package identifier that the R/S provides to the VOD SS during the process of generating the EAS Package. This is the same package that the R/S is currently transferring to the VOD Server. In other embodiments, the VOD SS may provide the address location of where the EAS asset was directed to in the VOD Server for storage.

Once the Preamble Asset and the Emergency Information Asset are known, the VOD SS then invokes the EAS EVENT function in the VOD Server. This function typically requires indication of two parameters. The parameters are referred to herein as "EAS Asset #1" (which is the Preamble Asset) and "EAS Asset #2" (which is the Emergency Information Asset). Once invoked, the process in the VOD SS is largely completed. These parameters could be asset identifiers or address locations, or any other type of identifier indicating the video files to use.

Figure 3B:
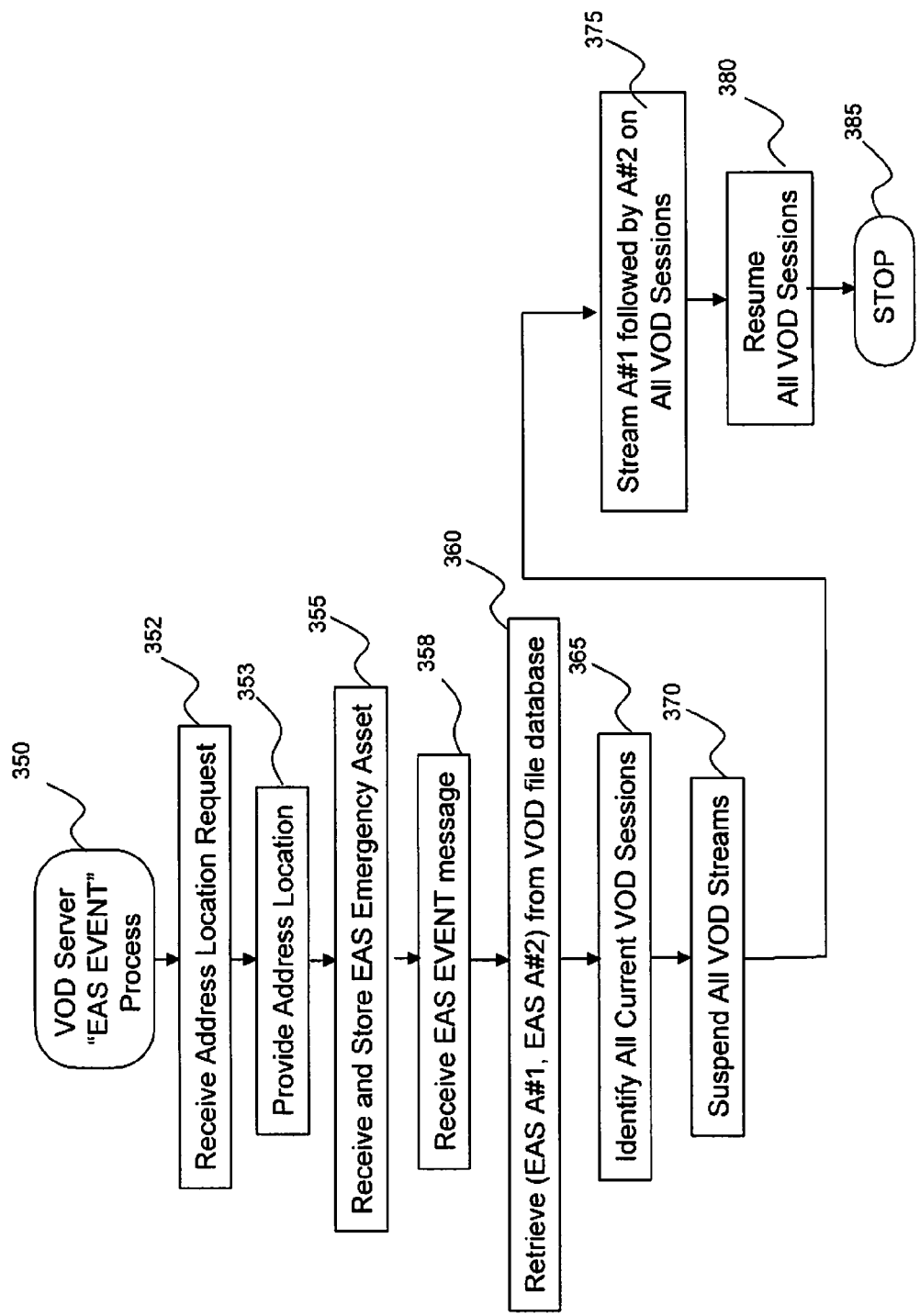
FIG. 3b illustrates a process flow associated with the EAS Event function of the VOD Server.

A corresponding process 350 is executed in the VOD Server and is shown in FIG. 3b. In FIG. 3b, the VOD Server receives a request in step 352 for a location to which the EAS Emergency Asset can be stored. The VOD Server responds in step 353 with the address, typically in the form of a URL. Then, the VOD Server begins to receive the EAS Emergency Asset in step 355, e.g., the video asset of the emergency message being broadcasted. The VOD Server is capable of ingesting in real time packages created by the R/S.

In the next step 358, the VOD Server receives an EAS EVENT function call (e.g., a message invoking the function), which includes parameters identifying the preamble (e.g., EAS Asset #1) and the EAS Emergency Asset (e.g., EAS Asset #2). In some embodiments, only a single parameter may be communicated, because the preamble is typically the same in each case. However, in this embodiment, the two assets making up the information presented to the viewer are identified—one for the preamble and one for the emergency information. The VOD Server in step 360 retrieves the assets in step 365.

The VOD Server maintains a list of all active VOD Session, and in response to the EAS Event, suspends all active VOD sessions, i.e., VOD sessions which are streaming VOD video to viewers. The VOD Server then sequentially streams the preamble (Asset #1) and the emergency information (Asset #2) in steps 370 and 375 over the channels associated with each of the respective suspended VOD streams. Once streaming of these assets is completed, the VOD Server then resumes each VOD session as appropriate in step 380. Resumption is accomplished by streaming the VOD programming on each respective channel without action by the VOD viewer. The process is then completed in step 385.

The VOD Support System is typically a processor based system executing software causing it to perform the above identified steps. Similarly, the VOD Server is a processor-based system executing software causing it to also perform the associated steps indicated above. The architecture of the VOD Support System can be based on various readily available generally programmable computing systems, including personal computers, distributed processing systems, etc. One such architecture is shown in FIG. 4, and represents only one potential embodiment.

Figure 4:
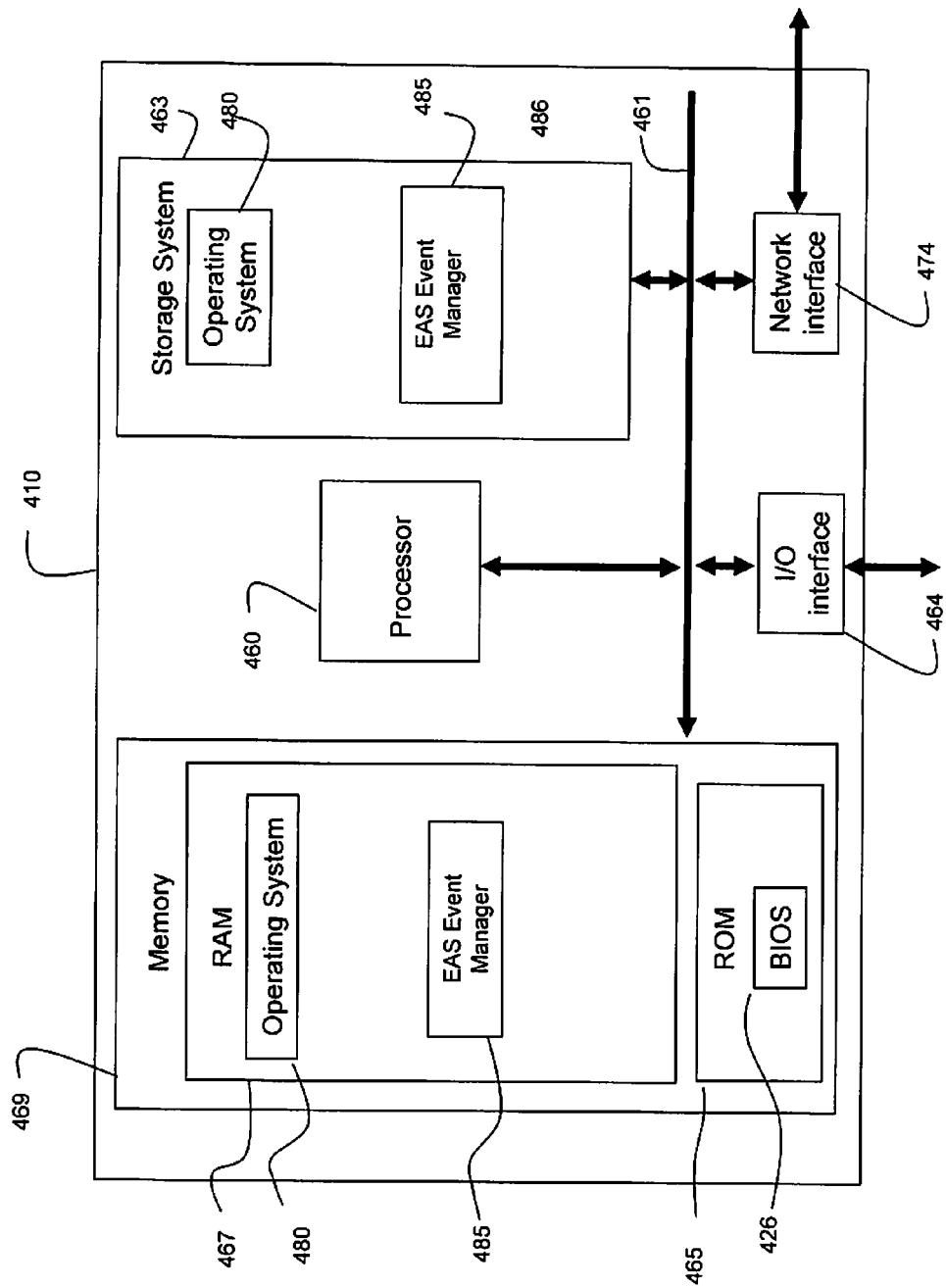
FIG. 4 illustrates one embodiment of a VOD Support System in an EAS system.

In FIG. 4, the VOD Support System 410 comprises a processor 460, which can be a single microprocessor, which communicates using a data/address bus 461 with the other components. The other components comprise memory 469, which may further comprises random access memory (RAM) 467 or other types of memory, such as DRAM, SRAM, Flash memory, etc. This memory stores a copy of the operating system 480 and the EAS Event Manager program 485, both of which are loaded into memory after the system is booted up. The EAS Event Manager comprises the programming steps and data necessary to perform the functions and actions previously described as being performed by the VOD Support System, but it could also be divided into two modules—one module for ingesting EAS information and initiating a query to the VOD Server, and another for invoking the EAS function. The VOD Support System also includes read-only memory ("ROM") 465, which may comprise a basic input/output system (BIOS) 426. The processor may also communicate with an internal storage system 463, which in one embodiment may be a form of secondary (long term) storage, and typically may comprise magnetic disk drives, tapes, or other well known forms of long term storage. The storage system may also store a permanent copy of the operating system 480, portions of which may be loaded in to the RAM at bootup. The storage system also maintains duplicate file(s) comprising the EAS Event Manager 485, which also is loaded into memory at bootup. Finally, the processor can also communicate with the I/O Interface 464 and/or the Network Interface 474 for communicating with other peripherals or other components. For example, the VOD Support System 410 may communicate over the network interface comprising a LAN with the VOD Server.

The VOD Server may have a similar architecture, and those skilled in the art will appreciate various architectures can be used, including various combinations of specialized hardware programmed to perform the functions and processes identified above, as well as various combinations of general programmable hardware configurations.

That which is claimed:

1. A system for providing emergency information to a VOD viewer comprising:
   a real-time video asset generator configured to receive emergency information from a video broadcast transmission and generate an emergency information digital video asset;
   a VOD server configured to store a plurality of video assets including an emergency alert information asset; and
   a VOD support system comprising a processor configured to:
      receive an emergency alert notification,
      request an address location from said VOD server where a video asset comprising said emergency alert information asset can be stored, receive a response from said VOD server indicating said address location, provide said address location to said real-time video asset generator, and
      invoke an EAS EVENT function in said VOD server, wherein said VOD server causes an emergency alert preamble and an emergency message to be provided to said VOD viewer.

2. The system of claim 1 wherein said real-time video asset generator is configured to receive said emergency information from said video broadcast transmission and generate said emergency alert information asset comprising digital video data and an emergency information asset identifier, said real-time video asset generator configured to transfer said digital video data to said VOD Server to a location identified by said address location, said real-time video asset generator further configured to transmit said emergency information asset identifier to said VOD support system.

3. The system of claim 2 wherein said VOD Server is configured to suspend a plurality of VOD sessions with a plurality of VOD viewers on a cable distribution system including said VOD viewer, said VOD Server further configured to resume said plurality of VOD sessions after providing said emergency alert preamble and said emergency message, wherein said each respective VOD session is resumed at a point where a respective VOD program was suspended.

4. The system of claim 3 wherein said VOD Server is configured to suspend said plurality of VOD sessions in response to receiving said EAS EVENT function request from the processor, said EAS EVENT function indicating a first parameter identifying said emergency information asset identifier.

5. The system of claim 4 wherein said EAS EVENT function further indicates a second parameter identifying said emergency alert preamble.

6. The system of claim 5 wherein said VOD server already has stored said emergency alert preamble.

7. The system of claim 4 wherein real-time video asset generator is configured to transmit said emergency alert information asset to said VOD server as said real-time video asset generator is receiving said emergency information.

8. The system of claim 2 wherein said real-time video asset generator is configured to generate digital video data from an over-the-air broadcast of emergency information.

9. A method for providing emergency information to a VOD viewer comprising the steps of:
receiving an EAS notification in a processor of a VOD Support System from a real-time video asset generator, wherein said real-time video asset generator is configured to generate an emergency information asset comprising said emergency information;
requesting an address location by said processor from a VOD server for storing an emergency information asset;
providing said address location to said real-time video asset generator;
transmitting at least a portion of said emergency information asset to said VOD server for storage; and
invoking by said processor at said VOD server, an EAS EVENT function wherein said VOD server causes an emergency alert preamble and said emergency information to be provided to said VOD viewer.

10. The method of claim 9 further comprising the steps of:
generating said emergency information asset comprising said emergency information by said real-time video asset generator;
providing an emergency information asset identifier to said processor; and
wherein said step of transmitting at least a portion of said emergency information asset to said VOD server occurs while said real-time video asset generator generates said emergency information asset.

11. The method of claim 9 wherein the VOD server in response to performing said EAS EVENT function performs the steps of:
suspending a VOD session associated with a VOD program with said VOD viewer; and
streaming to said VOD viewer an emergency alert preamble asset, followed by streaming said emergency information asset.

12. The method of claim 11 wherein the VOD server resumes streaming a remaining portion of said VOD program to said VOD viewer after streaming said emergency information asset.

13. The method of claim 11 wherein said EAS EVENT function invoked by said processor comprises sending a message to the VOD server comprising a first asset identifier identifying said emergency alert preamble asset and a second asset identifier identifying said emergency information asset.

14. The method of claim 9 wherein said VOD server has stored in memory said emergency alert preamble asset prior to said processor receiving an EAS notification.

15. A computer readable storage medium storing instructions causing a processor to perform the steps of:
receiving an indication of an EAS system event;
requesting in response to receiving said indication an address location from a VOD server for storing an emergency information asset;
receiving from said VOD server said address location;
providing a message to a real-time asset generation system of said address, said message instructing said real-time asset generation system to store said emergency information asset at said address location in the VOD server; and
requesting an EAS EVENT function in the VOD server by sending a second message indicating a first parameter for a first asset identifier associated with said emergency information asset.

16. The computer readable storage medium of claim 15 wherein the second message further indicates a second asset identifier associated with an emergency alert preamble asset.

17. A computer readable storage medium storing instructions causing a processor in a VOD server to perform the steps of:
receiving a request for an address location in said VOD server to store a digital video asset comprising an emergency information asset;
providing said address location in said VOD server for storing said digital video asset; and
receiving a request to invoke a function, wherein said function results in said processor to perform the steps of:
identifying a VOD user presently receiving a VOD video stream associated with a respective VOD session,
suspending said VOD session associated with said VOD user, and
streaming said digital video asset comprising said emergency information asset to said VOD user.

18. The computer readable storage medium of claim 17 further comprising the step of:
automatically resuming said VOD video stream after streaming said digital video asset.

19. The computer readable storage medium of claim 18 further comprising the steps of:
identifying a second video asset comprising an emergency alert preamble; and
streaming said second video asset comprising said emergency alert preamble prior to streaming said digital video asset.

20. The computer readable storage medium of claim 18 wherein said digital video asset is retrieved from memory based on a parameter conveyed with said request to invoke said function.

* * * * *